US012139948B2

(12) United States Patent
Capur

(10) Patent No.: US 12,139,948 B2
(45) Date of Patent: Nov. 12, 2024

(54) HINGE

(71) Applicant: Samet Kalip Ve Madeni Esya San. Ve Tic. A.S., Istanbul (TR)

(72) Inventor: Ertac Capur, Istanbul (TR)

(73) Assignee: Samet Kalip Ve Madeni Esya San. Ve Tic. A.S., Istanbul (TR)

( * ) Notice: Subject to any disclaimer, the term of this patent is extended or adjusted under 35 U.S.C. 154(b) by 48 days.

(21) Appl. No.: 17/802,064

(22) PCT Filed: Feb. 27, 2020

(86) PCT No.: PCT/TR2020/050152
§ 371 (c)(1),
(2) Date: Aug. 24, 2022

(87) PCT Pub. No.: WO2021/173090
PCT Pub. Date: Sep. 2, 2021

(65) Prior Publication Data
US 2023/0145622 A1 May 11, 2023

(51) Int. Cl.
*D06F 39/14* (2006.01)
*E05D 3/14* (2006.01)
(Continued)

(52) U.S. Cl.
CPC ............. *E05D 3/142* (2013.01); *D06F 39/14* (2013.01); *E05D 5/02* (2013.01); *E05D 7/04* (2013.01);
(Continued)

(58) Field of Classification Search
CPC ........... D06F 39/14; E05D 3/142; E05D 3/20; E05D 5/02; E05D 7/04; E05D 7/0407; E05D 7/12
See application file for complete search history.

(56) References Cited

U.S. PATENT DOCUMENTS 3,626,548 A * 12/1971 Grunert ..................... E05D 3/06 16/370
3,748,689 A * 7/1973 Grunert ................... E05D 11/06 16/237

(Continued)

FOREIGN PATENT DOCUMENTS

CN 1271063 A 10/2000
CN 102536016 A 7/2012

(Continued)

OTHER PUBLICATIONS

International Search Report for corresponding patent application No. PCT/TR2020/050152, dated Oct. 28, 2020, 11 pages (not prior art).

(Continued)

*Primary Examiner* — Joseph L. Perrin
(74) *Attorney, Agent, or Firm* — Lucian Wayne Beavers; Patterson Intellectual Property Law, PC

(57) ABSTRACT

The invention relates to a hinge for a furniture item or a domestic appliance, in particular for a washing machine, having a first hinge part (10) and a second hinge part (40), wherein the two hinge parts (10, 40) are interconnected in an articulated manner by means of two hinge levers (20, 30), wherein a base part (70) is provided that has a fastening portion (71) with fastening elements (72) and also has a holding receptacle (77), wherein the second hinge part (40) is held on the holding receptacle (77), wherein the base part (70) has a fastening portion (75) that interacts with a holding element (41.1) of the second hinge part (40) in order to bring about a releasable connection between the second hinge part (40) and the base part (70), wherein the holding receptacle (77) has a guide (76.1), and wherein, with the connection released, the second hinge part (40) is guided on the base part (70) along the guide (76.1), preferably in a linearly (Continued)

Figure 1:
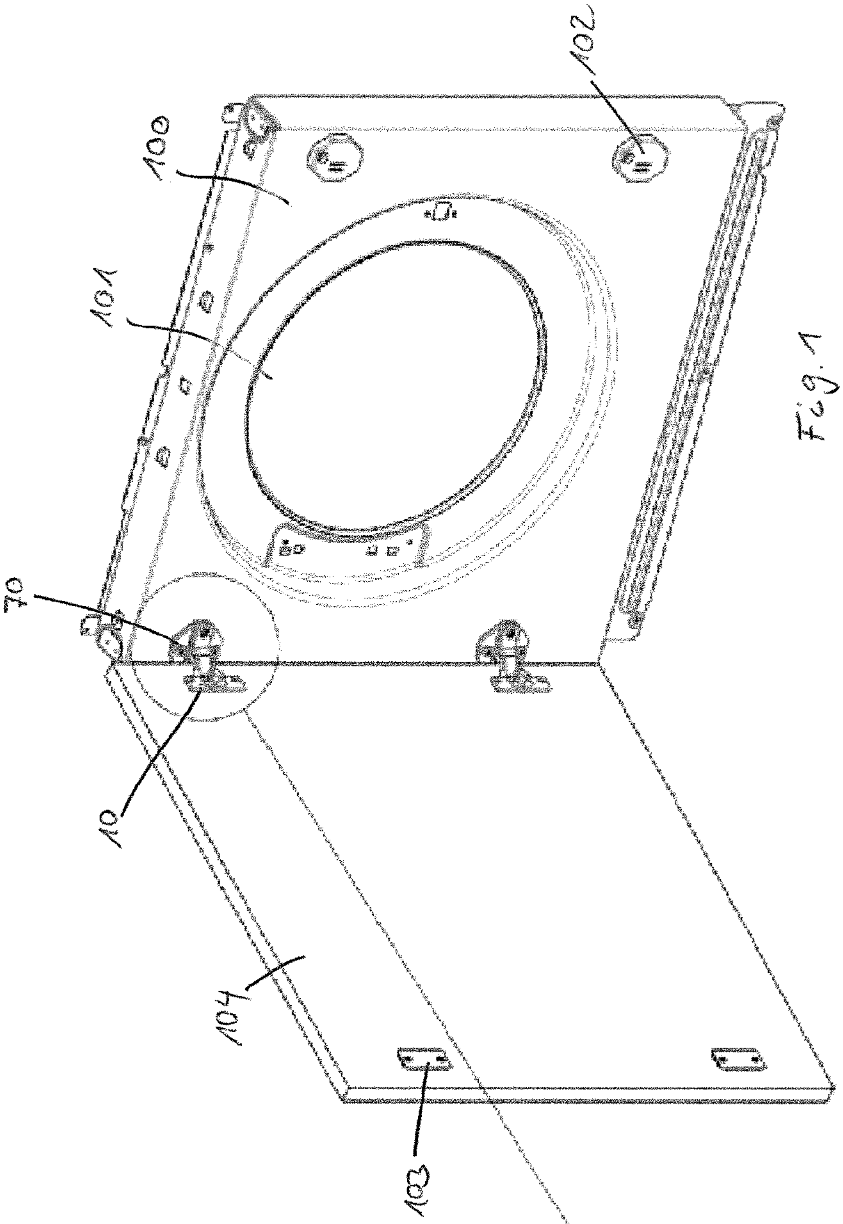

adjustable manner, by means of at least one sliding piece (43). Such a hinge allows heavy doors to be hinged on in a simple manner.

17 Claims, 16 Drawing Sheets

(51) Int. Cl.

| | |
|---|---|
| ***E05D 5/02*** | (2006.01) |
| ***E05D 7/04*** | (2006.01) |
| ***E05D 7/12*** | (2006.01) |
| ***E05F 3/20*** | (2006.01) |
| *E05F 3/04* | (2006.01) |
| *E05F 3/06* | (2006.01) |

(52) U.S. Cl.

CPC ............. *E05D 7/0407* (2013.01); *E05D 7/12* (2013.01); *E05F 3/20* (2013.01); *E05D 2007/0484* (2013.01); *E05D 2007/128* (2013.01); *E05F 3/04* (2013.01); *E05F 3/06* (2013.01); *E05Y 2600/626* (2013.01); *E05Y 2900/312* (2013.01)

(56) References Cited

U.S. PATENT DOCUMENTS

| | | | | |
|---|---|---|---|---|
| 3,909,879 | A * | 10/1975 | Grunert | E05D 7/0407 16/245 |
| 4,265,000 | A * | 5/1981 | Lautenschlager, Jr. | E05D 7/0407 16/238 |
| 4,290,167 | A * | 9/1981 | Lautenschlager | E05D 7/0407 248/668 |
| 4,937,917 | A * | 7/1990 | Rock | E05D 7/123 16/259 |
| 6,760,955 | B2 | 7/2004 | Salice | |
| 9,341,010 | B2 * | 5/2016 | Pyo | E05D 7/0009 |
| 9,644,411 | B2 * | 5/2017 | Gompper | E05D 7/0054 |
| 9,874,049 | B1 * | 1/2018 | McGregor | E05D 5/065 |
| 11,111,711 | B2 | 9/2021 | Capur et al. | |
| 2011/0248130 | A1 | 10/2011 | Salice | |
| 2016/0138319 | A1 * | 5/2016 | Wu | E05D 3/02 16/50 |
| 2017/0254128 | A1 * | 9/2017 | Ng | E05D 3/02 |

FOREIGN PATENT DOCUMENTS

| | | | |
|---|---|---|---|
| CN | 104220689 | A | 12/2014 |
| CN | 108179943 | A | 6/2018 |
| CN | 108425584 | A | 8/2018 |
| EP | 3450666 | A1 | 6/2019 |
| JP | 2004052401 | A | 2/2004 |
| KR | 200474655 | Y1 | 9/2014 |
| WO | 2010102445 | A1 | 9/2010 |
| WO | 2013175983 | A1 | 11/2013 |

OTHER PUBLICATIONS

China Office Action for corresponding patent application No. 2023062503224360, dated Jun. 25, 2023, 6 pages (not prior art).
Translation of cited Foreign Patent No. CN 102536016.
India Office Action for the corresponding patent application No. 202247048049, dated Oct. 4, 2022, 6 pages (not prior art).

* cited by examiner 10
19
20
29
30
32
35
36
44.1
45.1
51
52
53
60
61
63
64
65
66

10
19
20
29
36
44.1
45.1
50
51
52
53
60
61
63
64
65
66

HINGE

The invention relates to a hinge for a piece of furniture or a household appliance, in particular for a washing machine.

Hinges for furniture are known in many ways in the state of the art. The most common hinges have two hinge parts that are interconnected by two articulated levers. An articulated lever with a hinge is coupled to each of the two hinge parts. In this way, a four-bar linkage system is formed. Usually, one of the hinge parts has a hinge cup. This hinge cup is the first hinge part to be inserted into a recess of a furniture part, in particular a door. The other hinge part is then used to attach the hinge to the cabinet box. Such hinges are also increasingly used in household appliances. Accordingly, doors are hinged to the body of these household appliances. The closed door can be used to cover the front panel of the household appliance.

The invention addresses the problem of providing a hinge for a piece of furniture or a household appliance, which can be used, in particular, to hinge heavy doors in a simple manner.

A hinge is proposed having a first hinge part and a second hinge part, wherein the two hinge parts are interconnected in an articulated manner by means of two hinge levers, wherein a base part is provided, which has a mounting section with fasteners and a retaining mount, wherein the second hinge part is retained on the retaining mount, wherein the base part has a mounting section which interacts with a retaining element of the second hinge part in order to establish a releasable connection of the second hinge part to the base part, wherein the retaining mount has a guide, and wherein at least one sliding piece of the second hinge part is guided on the guide of the base part in a preferably linearly adjustable manner when the connection is released. Particularly preferably, the hinge is designed in such a way that, in the assembled state, it is linearly adjusted in the horizontal direction.

In this hinge arrangement, the base part can be connected to a furniture part, for instance, to the cabinet box. The fasteners and the mounting section on the base part are provided for this purpose. The other furniture part, for instance the furniture door, can be connected to the second assembly unit of the hinge, which is pre-assembled with the two hinge parts and the hinge levers. To complete the hinge, the second assembly can now be connected to the base part. For this purpose, the second hinge part is inserted into the retaining mount of the base part and connected thereto. Inserting the door is particularly easy because the base part has the retaining mount. There, it is easy to find the second hinge part even in complex installation conditions. In particular, installation is easy and successful, even if a heavy door is installed.

When the second hinge part is inserted into the retaining mount, the detachable connection can be used to connect it to the base part. In this case, this connection is selected such that the second hinge part can be adjusted with respect to the base part to be able to effect an exact alignment of the door with respect to the cabinet box. It is particularly preferred that this guide permits the linear adjustment of the second hinge part relative to the base part. Then the door can be aligned on the guide, guided exactly in one direction.

According to a preferred embodiment of the invention, provision may be made for the base part to form the attachment mounts on the mounting section in the form of elongated holes, for these elongated holes, with regard to their longitudinal extension, to extend transverse to the linear adjustment direction defined by the guide, in particular perpendicular thereto. In this way, in conjunction with the guide between the second hinge part and the base part described above, the second hinge part can be aligned in one plane. In this case, the two slotted holes and the guide described above guarantee in the simplest way that (within the range of adjustment permitted by the hinge) alignment can be achieved at any point in this plane.

Stable guidance of the second hinge part on the base part is achieved in a simple manner if provision is made for the base part to have two spaced-apart guides having guide surfaces, which extend in the area of the retaining mount, for the second hinge part to have two sliding pieces in the form of wall elements on opposite sides, and for the sliding pieces of the second hinge part to be guided linearly on one guide surface each in the retaining mount.

Particularly preferably, a hinge according to the invention is designed in such a way that the base part has a front end and a rear end, that the first hinge part is arranged in the area of the front end and the base part forms a mounting surface at the rear end, for mounting at a piece of furniture or a machine part.

In such a hinge, according to the invention provision may be made for the base part to have a connection piece, which is arranged at a distance from the mounting surface and which has a form-fit surface directed towards the rear end of the base part, and for the second hinge part to have a lug, which rests against the form-fit surface to form a form-fit connection in the direction from the rear end towards the front end. When assembling this hinge, the second hinge part is inserted into the retaining mount. The lug of the second hinge part engages behind the form-fit surface of the base part. In this way, a form-fit connection is provided, which can be used to pre-attach the hinge when the door is clipped to the cabinet box. This facilitates the workflow. After the door has been attached to the cabinet box, the second hinge part can be conveniently connected to the base part, for instance, using a screw connection.

According to a preferred variant of the invention, provision may be made for the base part to have a clamping section, against which a mounting section of the second hinge part rests, and for the mounting section to be braced with the clamping section by means of a clamping element, in particular a clamping bolt, in the assembly position. The main load forces, applied to the hinge by the weight of the door, are transmitted from the second hinge part to the base part via the guide described in claim 1. There the force is transferred in a sable manner. Accordingly, a single clamping bolt can preferably be used to easily secure the second hinge part to the base part. Because the clamping section rests against the mounting section and is clamped there, the second hinge part is assigned to the base part with dimensional accuracy.

According to the invention, provision may also be made for a mounting section to be arranged projecting from the base part in the area of the clamping section, for the mounting section to have a bolt mount, for the retaining element of the second hinge part to be arranged on the mounting section and to have a penetration, which is preferably formed as an elongated hole or has such a hole, for the mounting section to project into the penetration, and for the clamping bolt to be bolted to the bolt mount. The assignment of the mounting section in the penetration can be used to limit the possible range of adjustment of the second hinge part relative to the base part. Because the mounting section is also equipped with a screw mount, a space-saving design for the hinge is achieved.

The base part then forms a stable structural unit, which is particularly suitable for bearing large loads, if provision is made for the base part to have the two spaced-apart guides, which are interconnected by means of the clamping section and the connection piece, wherein the guides, the clamping section and the connecting piece delimit the retaining mount.

According to a particularly preferred variant of the invention provision may be made for one of the hinge parts, preferably the second hinge part, to bear a damper unit having a damper, which is preferably designed as a linear damper, in particular as a fluid linear damper having a damper housing, a piston guided therein and a piston rod coupled to the piston, for the damper to be mounted at least sectionally in an area enclosed by the hinge part, and for one of the hinge levers to have an actuating piece, which, when the hinge lever is moved between two actuating positions, effects a displacement of the damper between two damping positions. Because the damper is at least partially enclosed by the assigned hinge part, a visually appealing and at the same time compact design is provided.

The damper dampens the closing motion of the door. This prevents the door from hitting the cabinet box or machine body hard.

It is also conceivable to design a hinge that performs damping in the direction of the opening motion. This prevents heavy hinge stress caused by the dynamic forces generated when the door is opened with a swing.

According to the invention, provision may also be made for one of the mutually displaceable actuating parts, for instance the piston rod or the damper housing, of the damper, preferably the piston rod, to have an actuating piece supported on a counter bearing of the second hinge part, and for the second actuating part, for instance the damper housing, to be supported directly on the actuating piece. Such direct support results in a lower number parts and reduced assembly costs for the hinge. However, it is also conceivable that a carriage is used to couple the second actuating part to the actuating piece. The carriage secures the damper and guarantees a linear damping motion. This is particularly advantageous for fluid linear dampers in favor of a long service life. In this way, transverse forces introduced in the area between the piston rod and the damper housing are eliminated or at least reduced. This protects the piston seal of the fluid linear damper.

When using a carriage, provision may be made in particular for the carriage to have a base part having a damper mount, in which the damper is at least partially mounted, for the carriage to be guided by means of a guide, in particular a linear guide, in the second hinge part, and for the carriage to have a support section for the indirect or direct operative engagement of the actuating piece.

To be able to effect an exact adjustment and at the same time a reliable guidance of the carriage, provision may be made according to the invention for the carriage to have at least one coupling piece, which projects from the base part and which bears the support section, for the coupling piece to have a mount, which is used to swivel couple the latter to a holder of a connector, and for the connector to be swivel coupled to one of the articulated levers.

To implement a simple and cost-efficient design provision may be made for the damper, which is designed as a linear damper, to be held between two retaining elements of the second hinge part. At the same time, these retaining elements can also have or form the above-mentioned sliding pieces.

According to a variant of the invention, it is conceivable that at least one locating element is used to support a part of the damper unit transverse to the damping direction to hold the damper on the hinge part, wherein a displacement motion of the part of the damper unit relative to the locating element in the damping direction of the damper is possible, and wherein the locating element is anchored to one, preferably to both, retaining elements. This makes for an easy automated assembly of the hinge. The damper only has to be inserted into the hinge part. The locating element(s) can then be used to attach the damper unit to the hinge part in a fully automated manner.

If provision is made for the locating element or elements to be designed as a bolt, for the retaining elements to have locating mounts, which are interaligned in pairs, and for a bolt to be inserted into the aligned locating mounts, then the bolts can be easily inserted into the aligned locating mounts during assembly and can then be secured, for instance swaged, in the retaining elements.

However, it is also conceivable that the at least one locating element is designed as a retaining lug, which projects from the retaining element and which is preferably designed as a latching projection integrally formed to the retaining element. Then the damper can simply be inserted into the hinge part and latched in conjunction with the latter in its intended position.

The problem of the invention is also solved by a washing machine having a washing machine body comprising a washing machine front panel, wherein the washing machine front panel is penetrated by a loading opening which provides access to a washing drum of the washing machine. Here, provision may be made for a door having hinges according to any one of the claims 1 to 13 to be hinged to the washing machine body.

Figure 2:
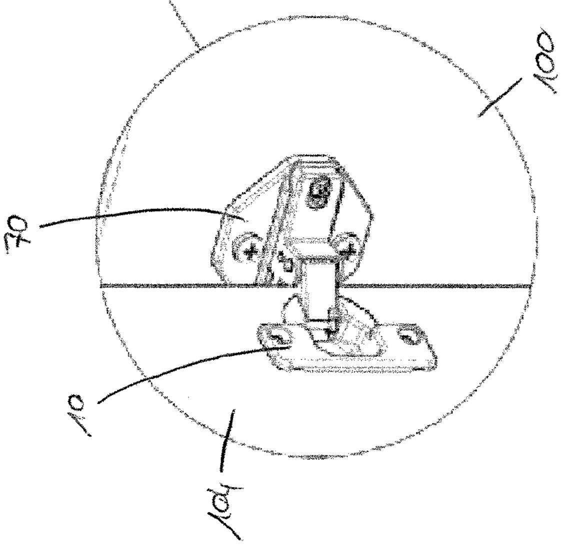
Figure 4:
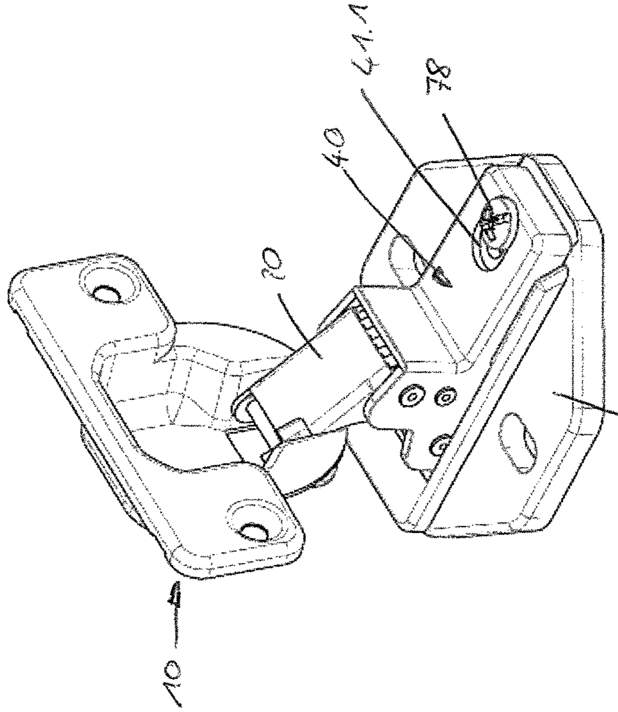
Figure 3:
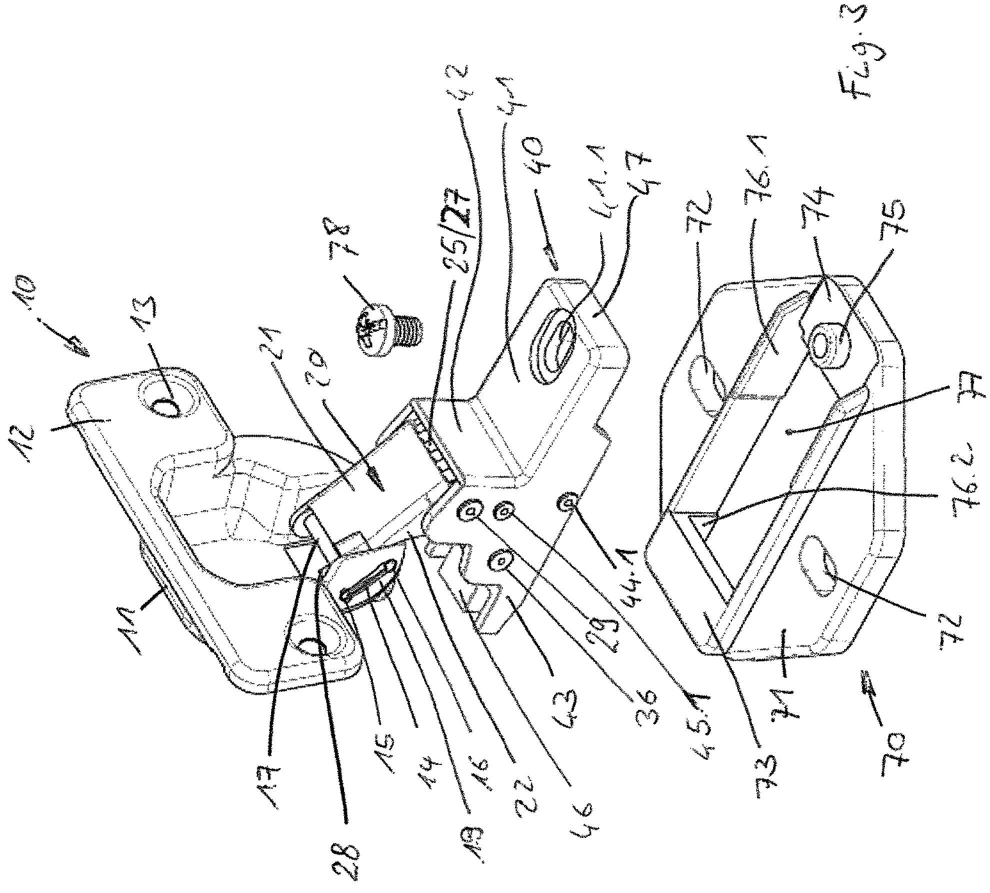
Figure 5:
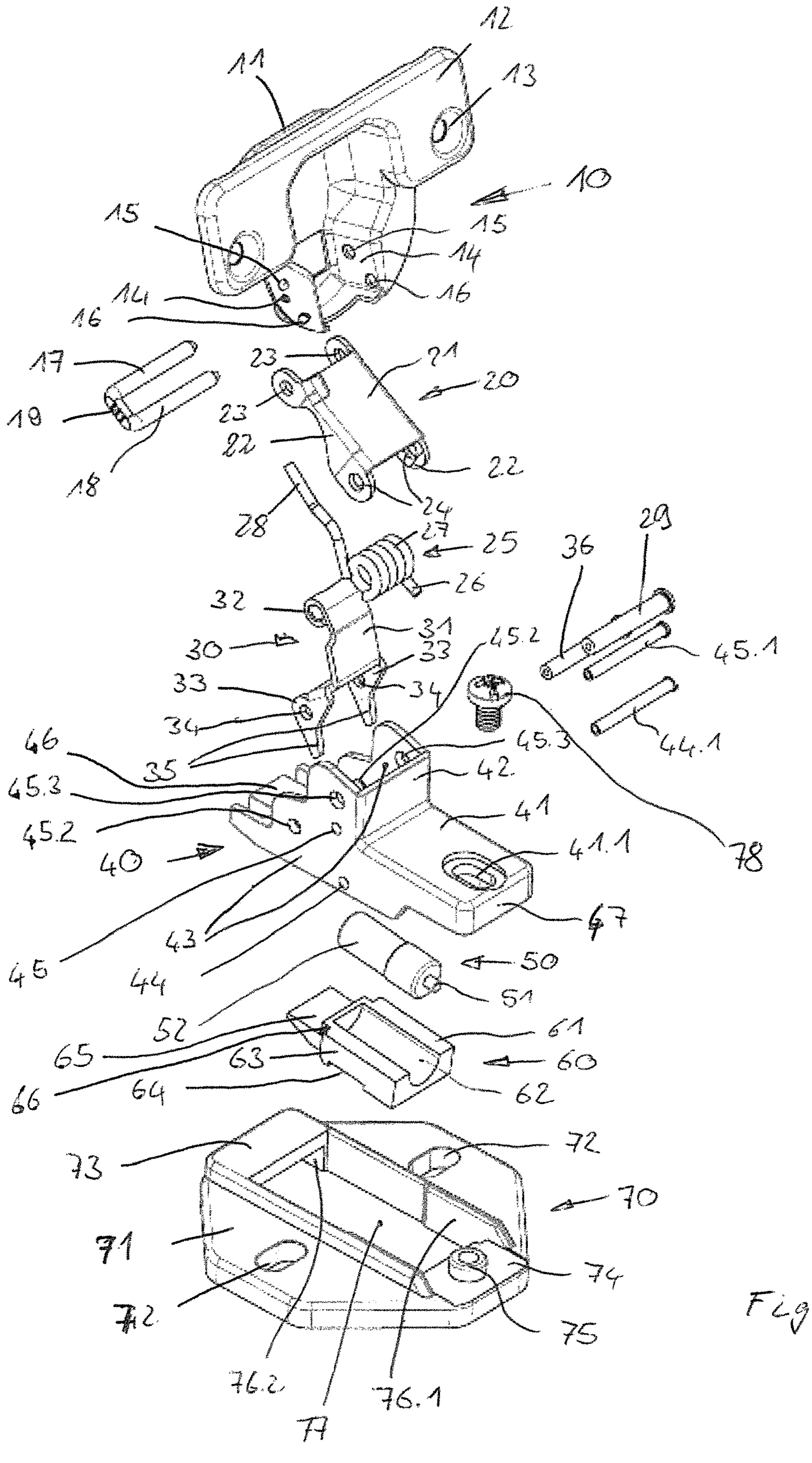
Figure 7:
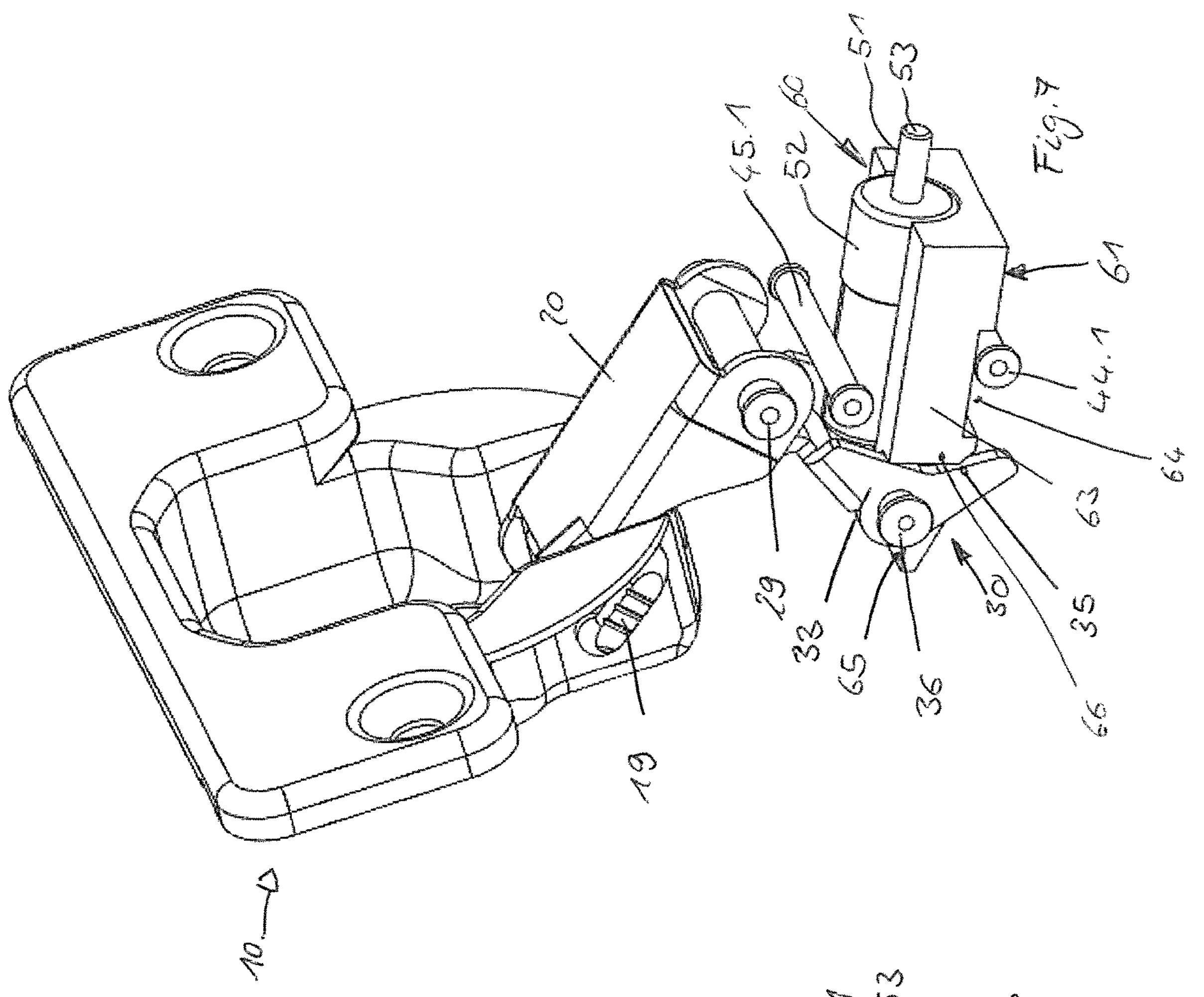
Figure 8:
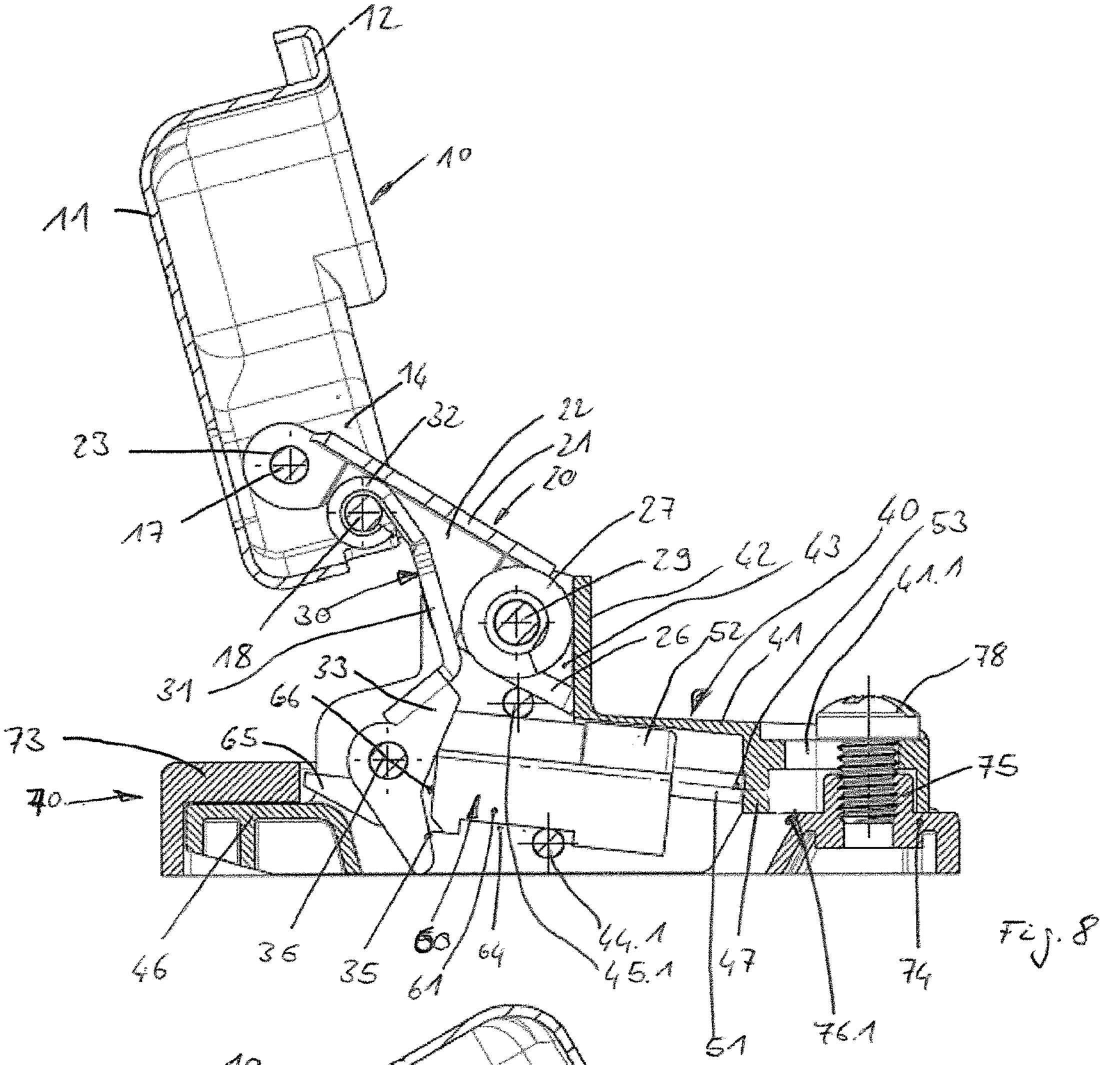
Figure 9:
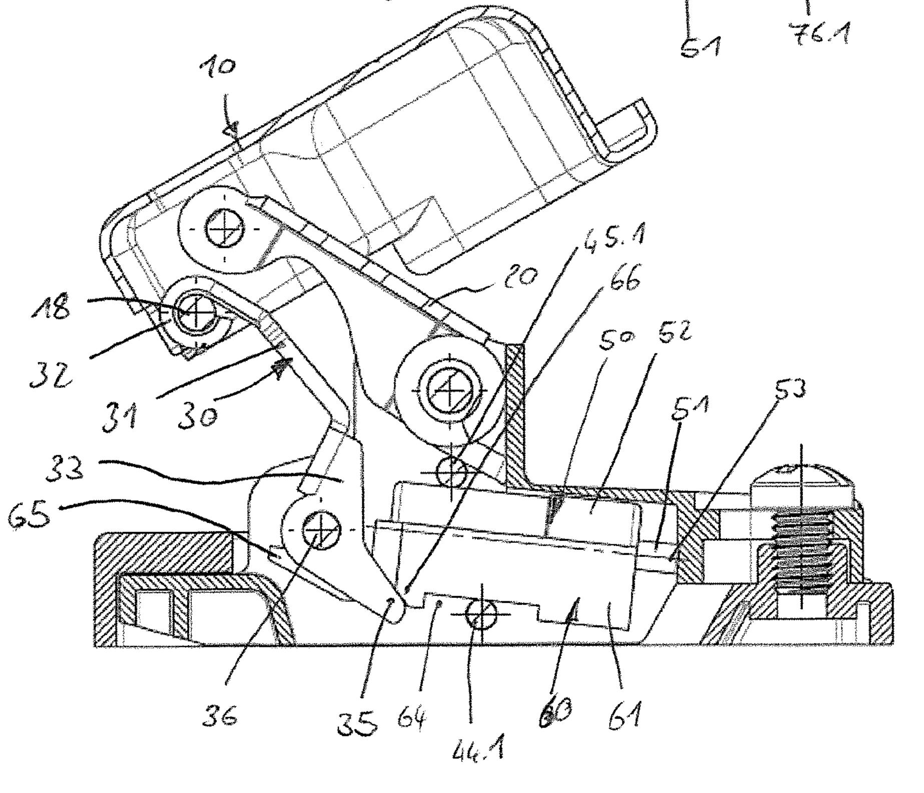
Figure 10:
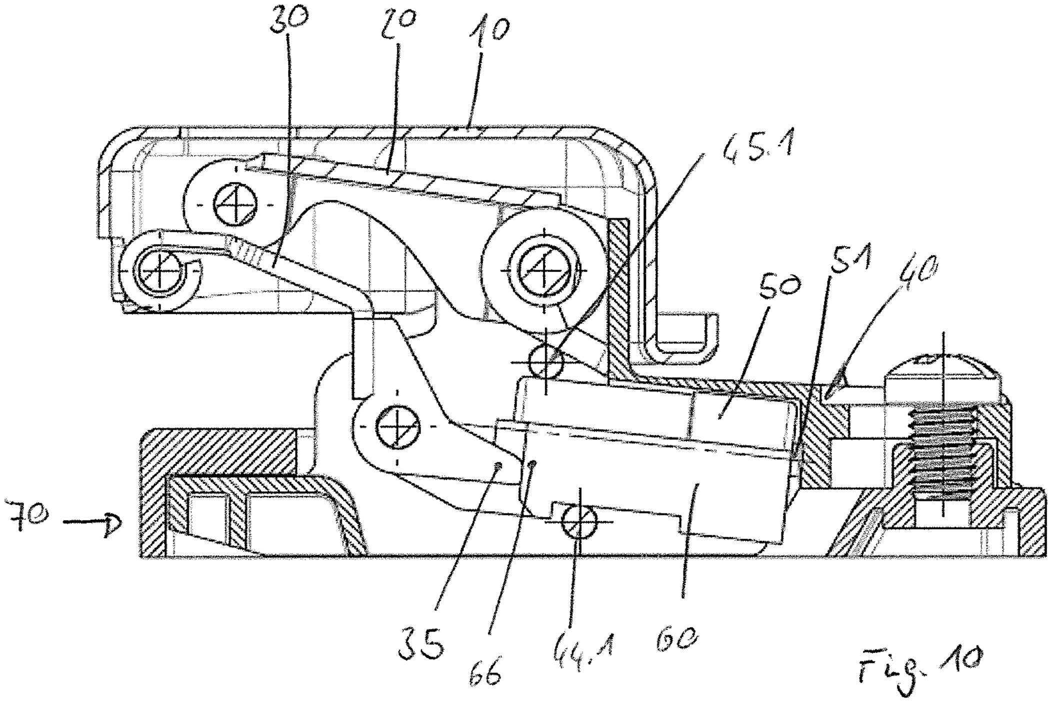
Figure 12:
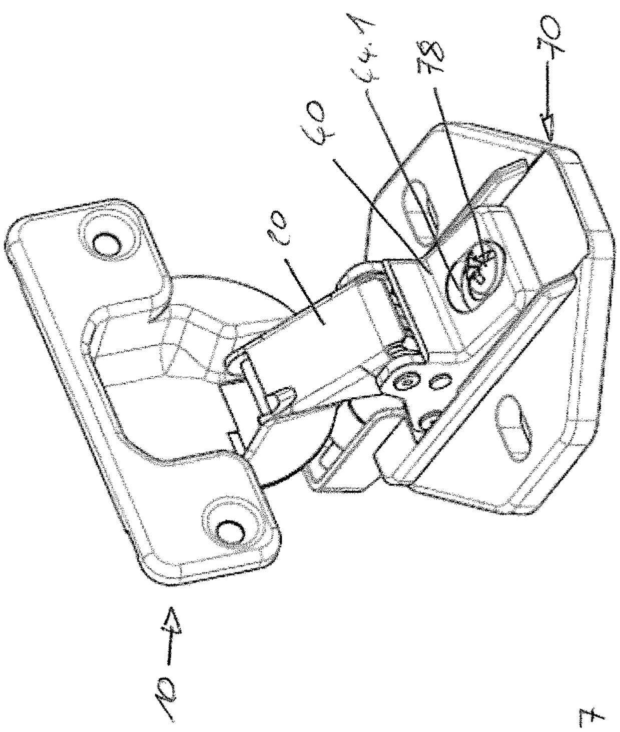
Figure 11:
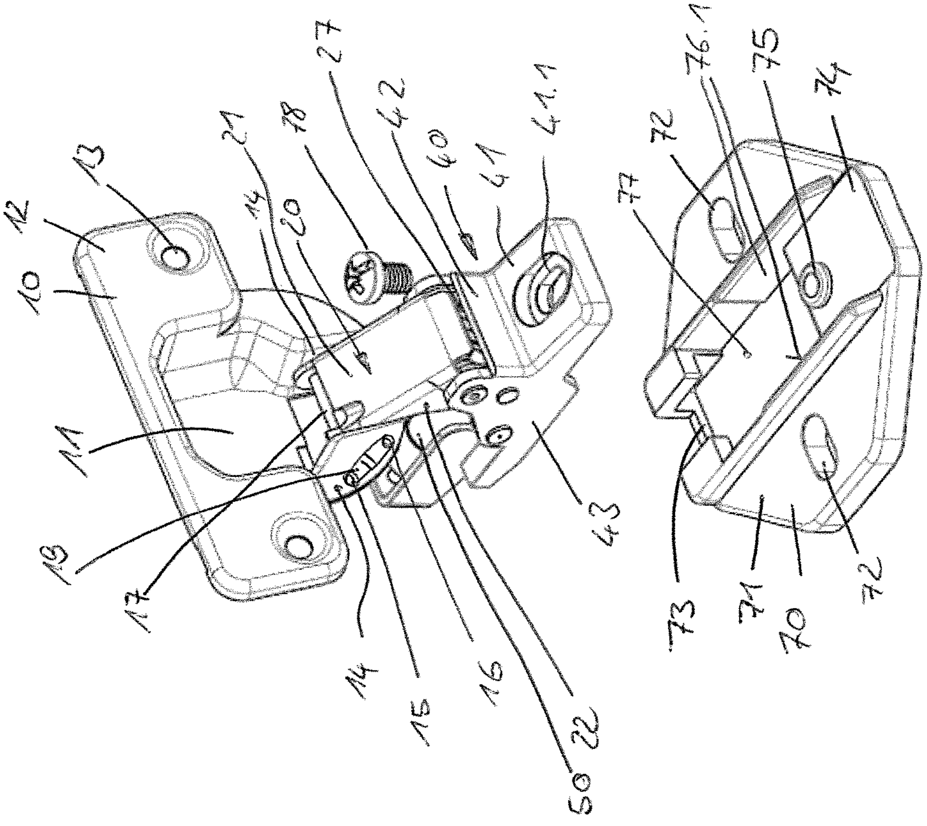
Figure 13:
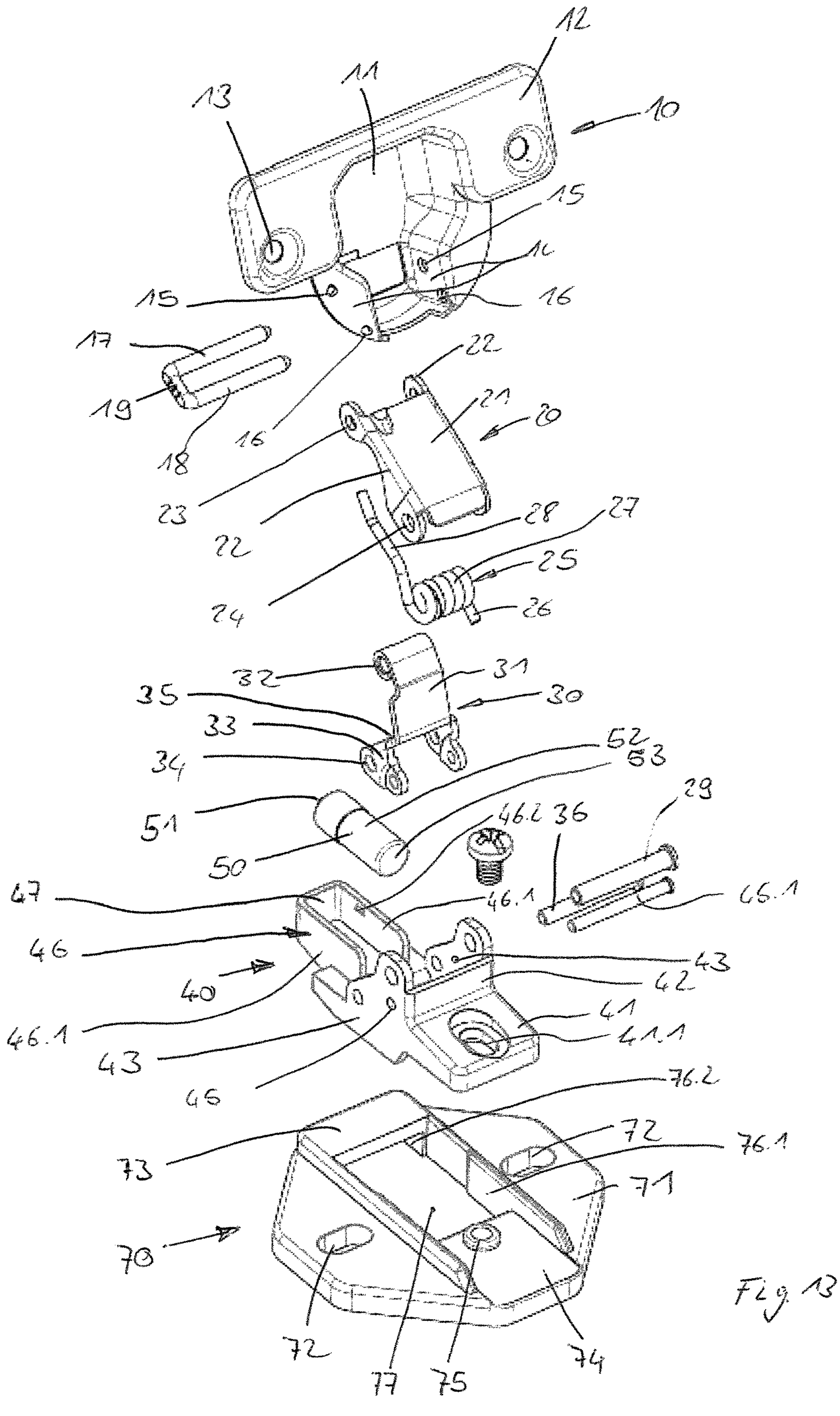
Figure 14:
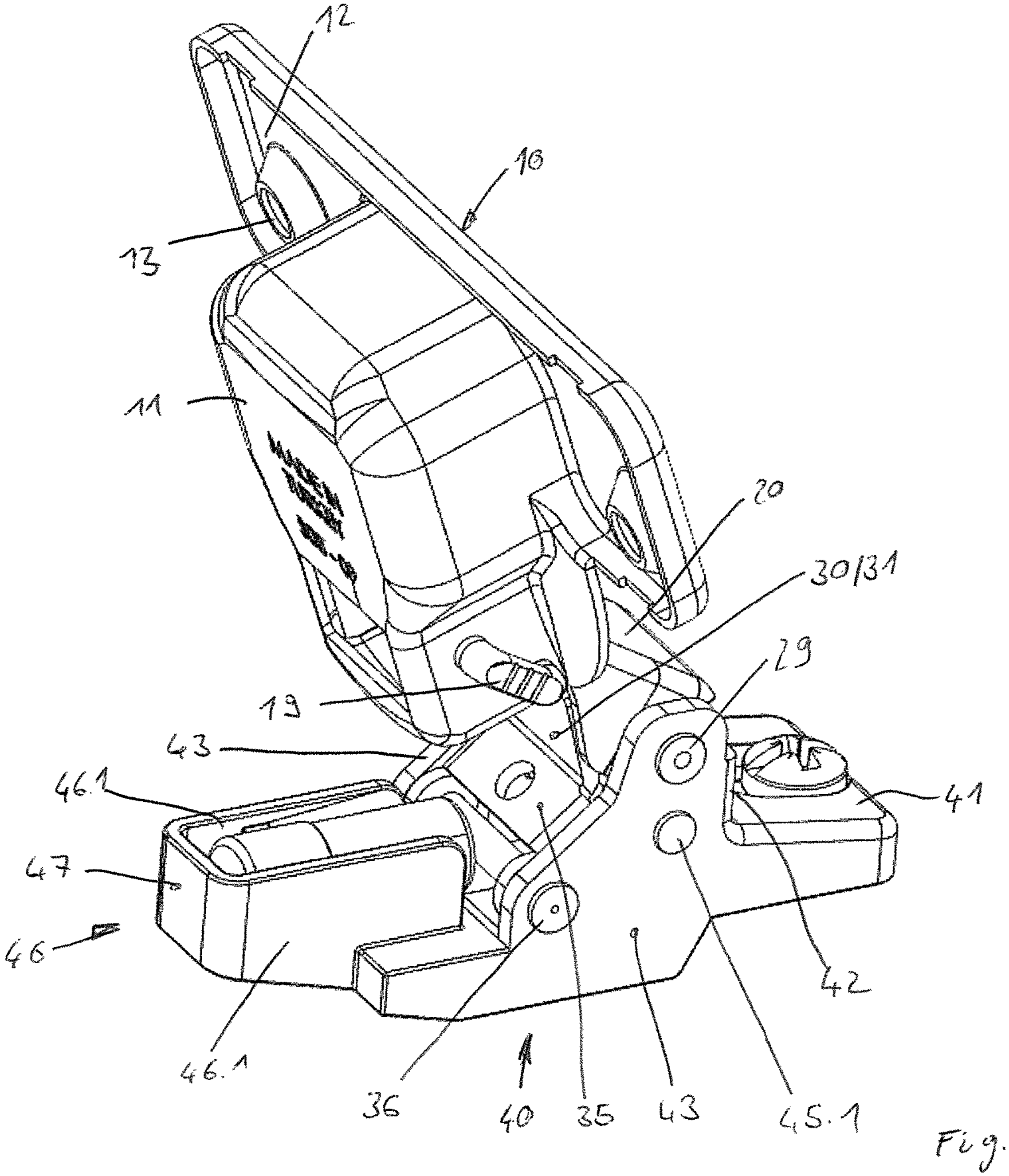
Figure 15:
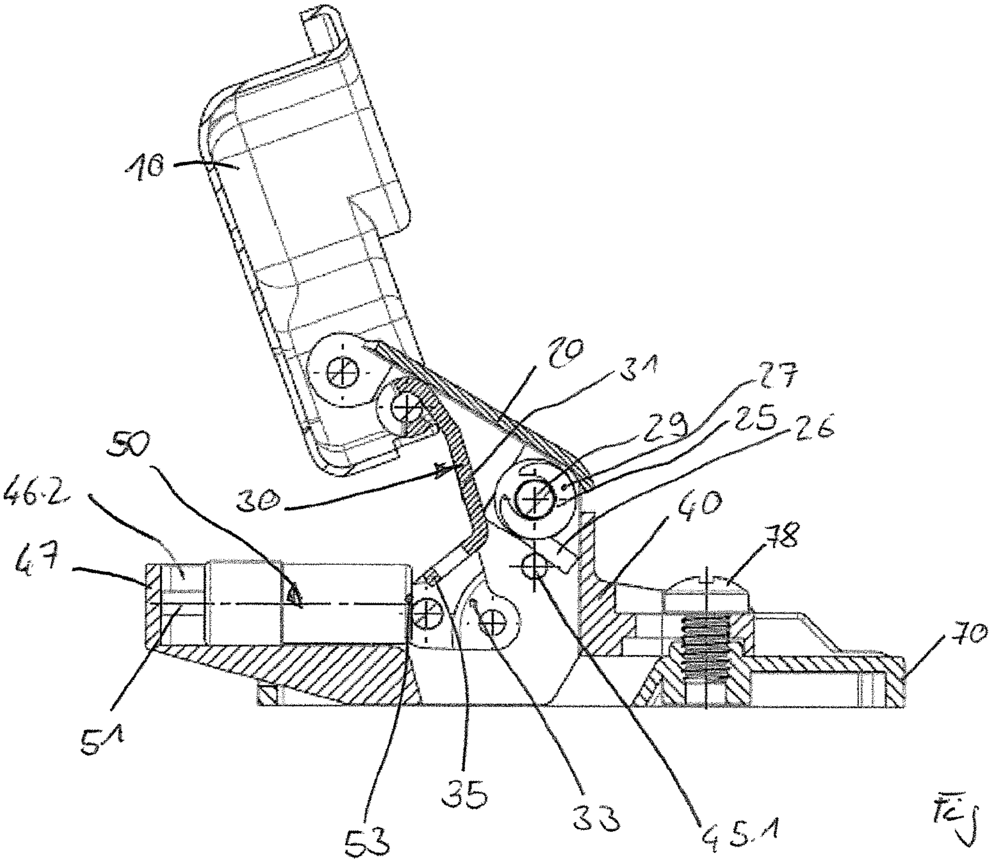
Figure 16:
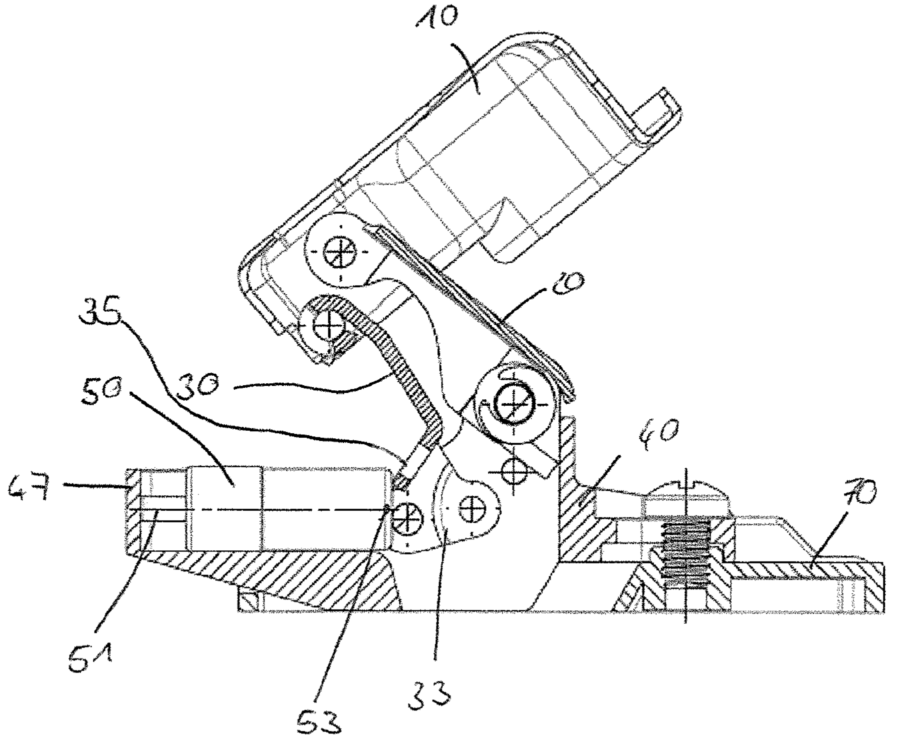
Figure 17:
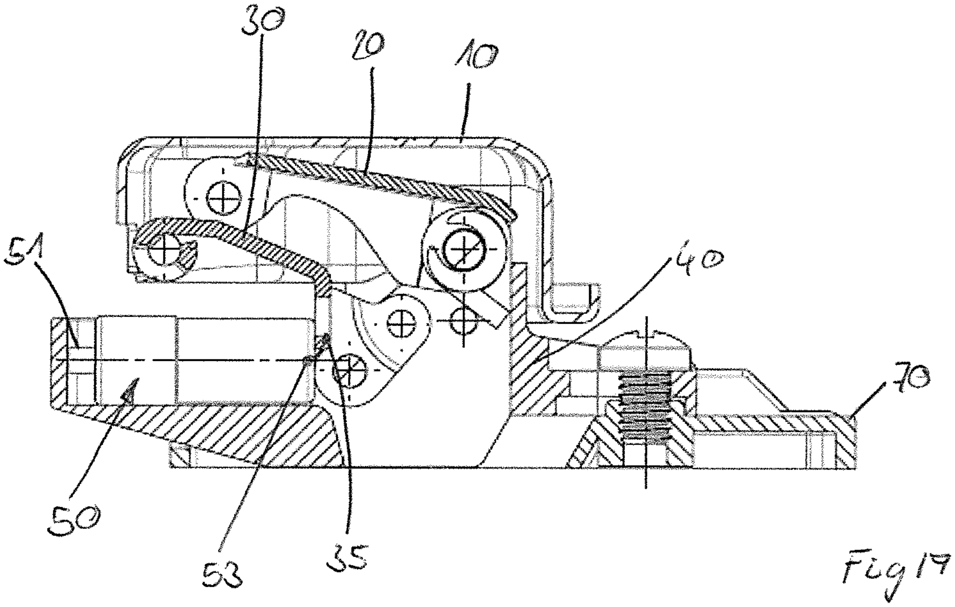
Figure 19:
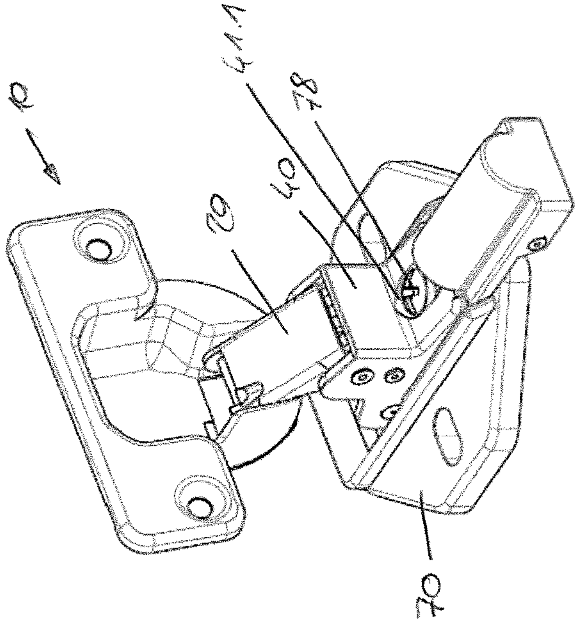
Figure 18:
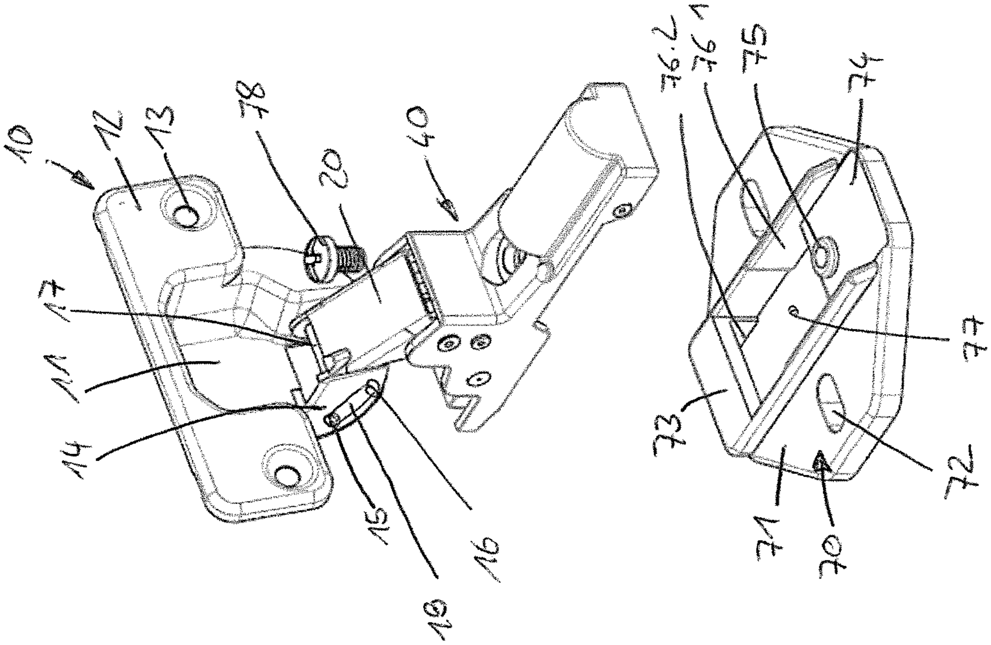
Figure 20:
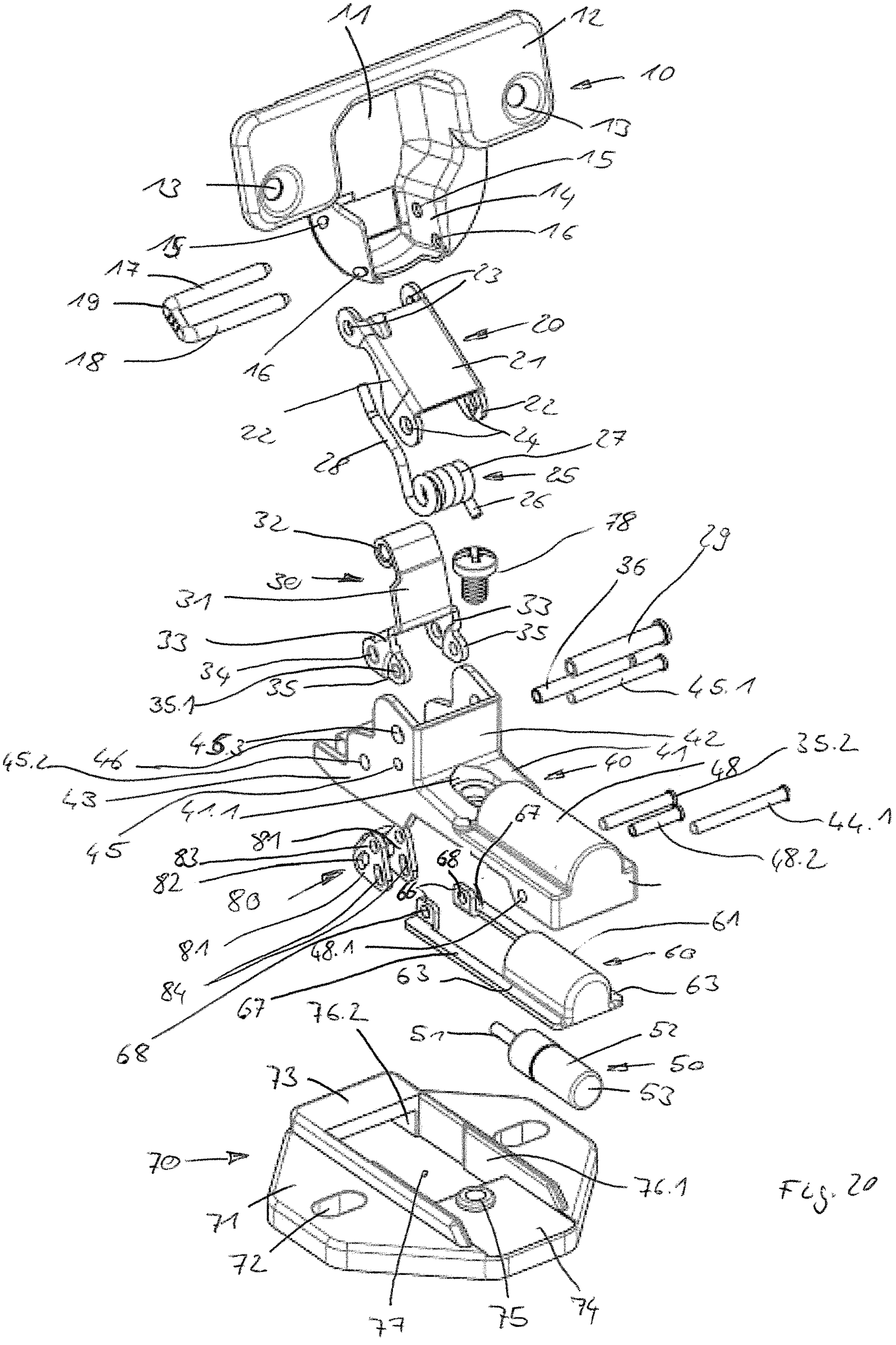
Figure 21:
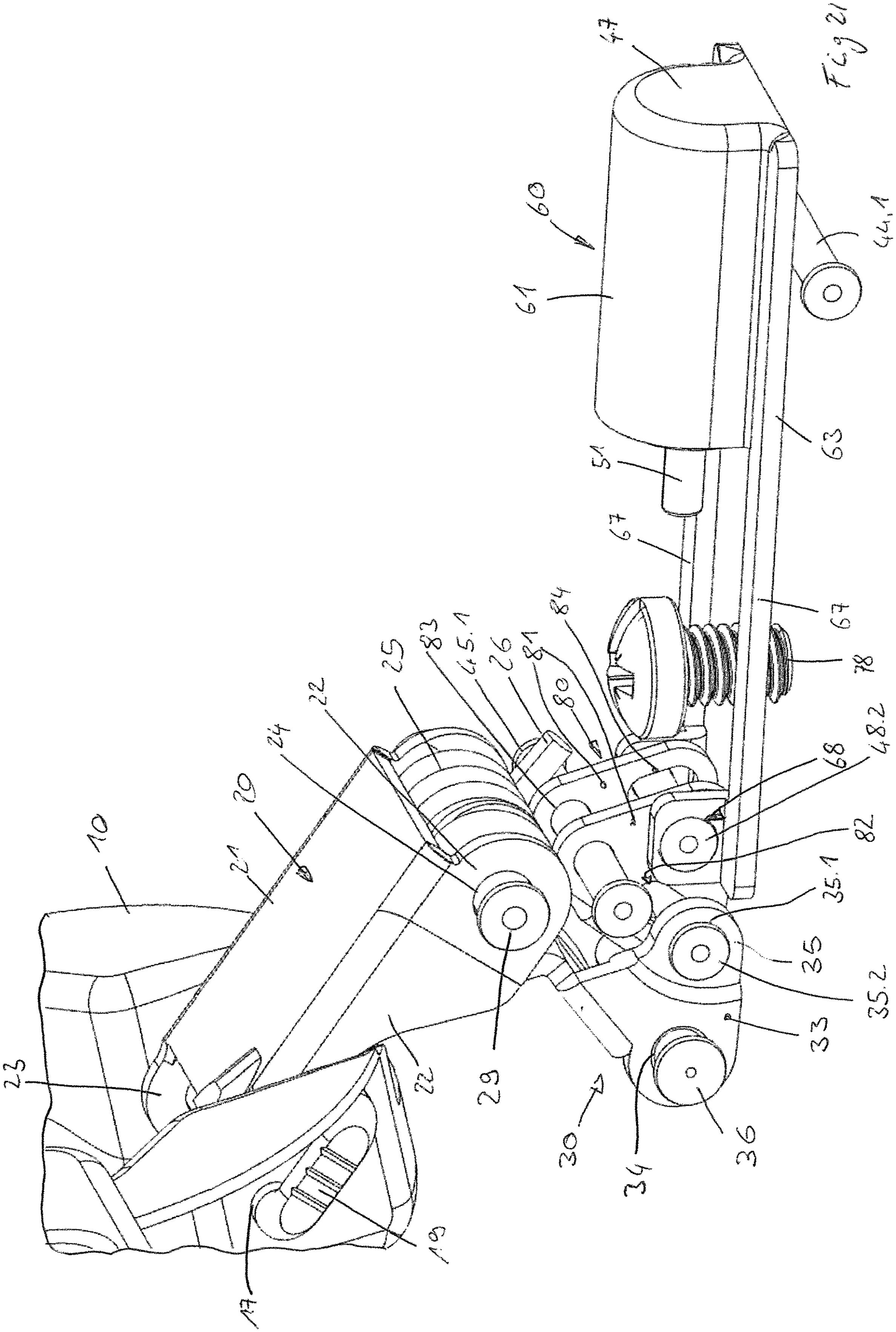
Figure 22:
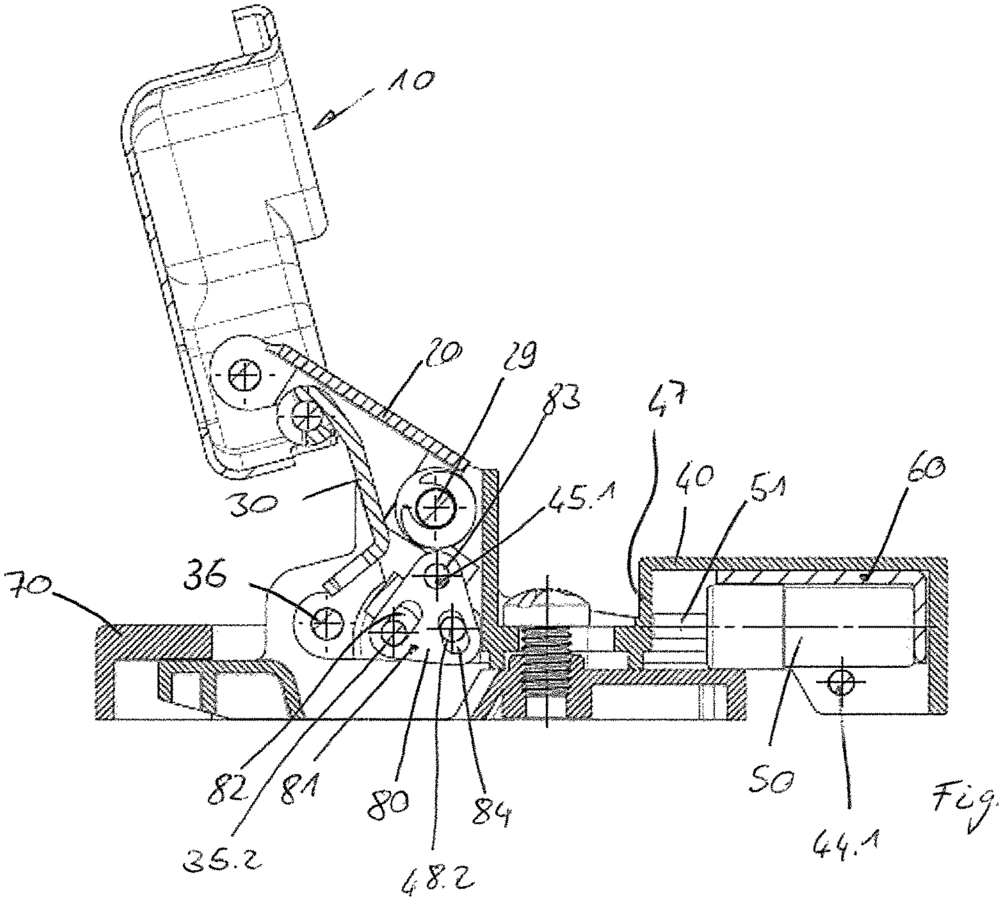
Figure 23:
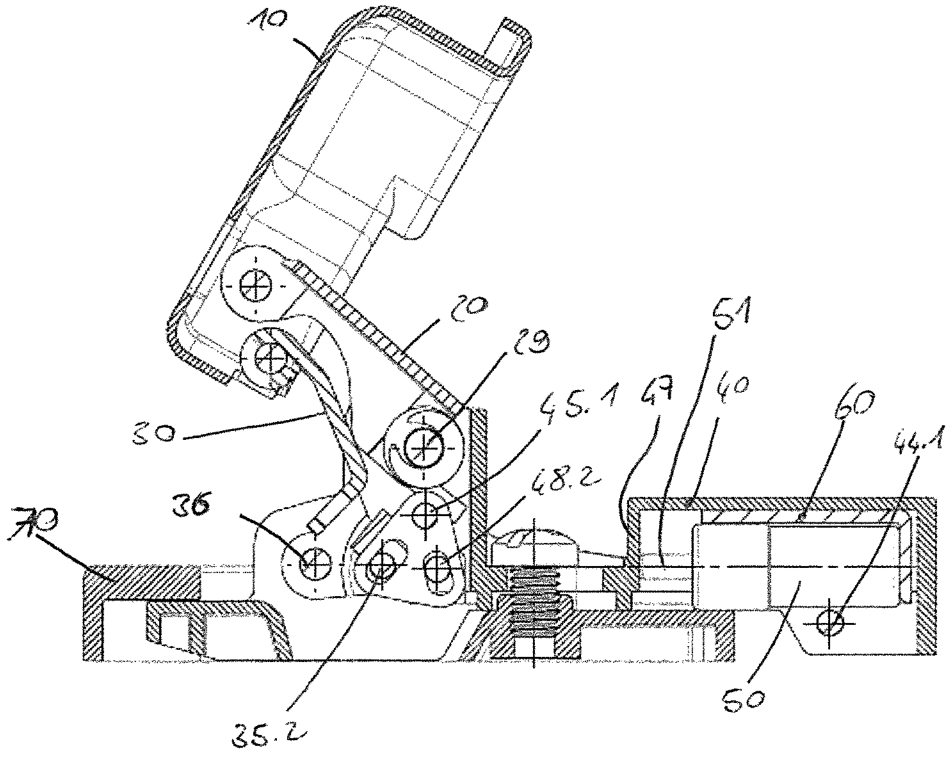
Figure 24:
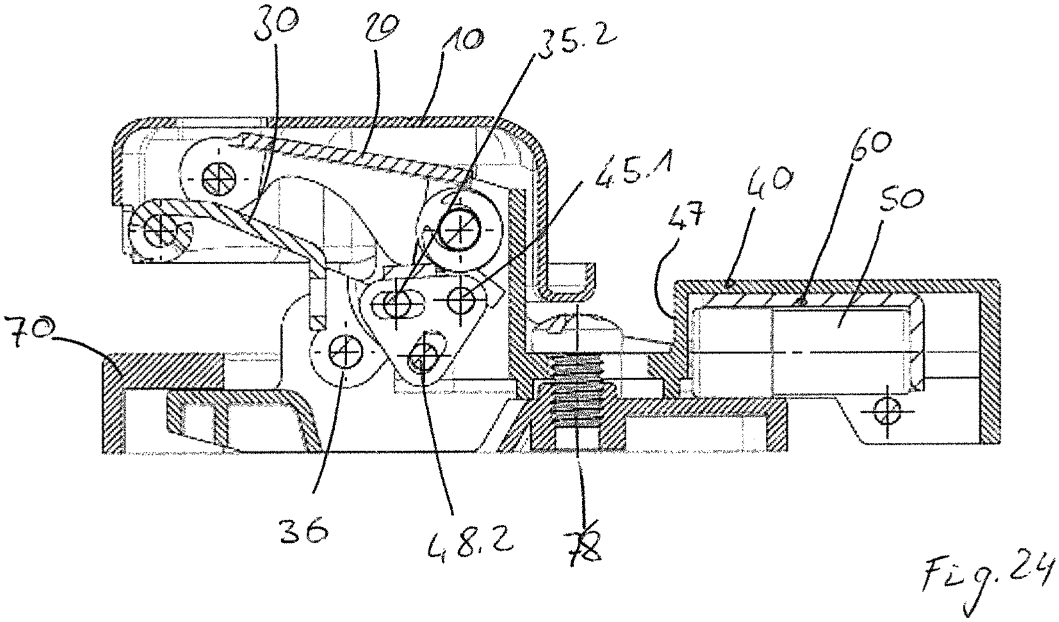

The invention is explained in greater detail below based on exemplary embodiments shown in the drawings. In the Figures:

FIG. 1 shows a partial representation of a washing machine front panel having a hinged door, FIG. 2 shows a detail taken from FIG. 1, FIG. 3 shows a partially exploded view of a first design variant of a hinge, FIG. 4 shows the hinge according to FIG. 3 after assembly, FIG. 5 shows an exploded view of the hinge of FIGS. 3 and 4, FIGS. 6 and 7 show the hinge of FIGS. 3 to 5 in a partially assembled state, FIGS. 8 to 10 show a sectional views of different operating positions of the hinge according to FIGS. 3 to 7, FIG. 11 shows a partially exploded view of a second design variant of a hinge, FIG. 12 shows the hinge according to FIG. 11 after assembly, FIG. 13 shows an exploded view of the hinge of FIGS. 11 and 12, FIG. 14 shows the hinge in accordance of FIGS. 11 to 13 in a partially assembled state, FIGS. 15 to 17 show a sectional views of different operating positions of the hinge according to FIGS. 11 to 14, FIG. 18 shows a partially exploded view of a third design variant of a hinge, FIG. 19 shows the hinge according to FIG. 18 after assembly, FIG. 20 shows an exploded view of the hinge of FIGS. 18 and 19, FIG. 21 shows the hinge of FIGS. 18 to 20 in a partially assembled state, and FIGS. 22 to 24 show sectional views of different operating positions of the hinge according to FIGS. 18 to 21.

LIST OF THE REFERENCE NUMERALS

10 first hinge part
11 hinge cup
12 mounting flange
13 screw mount
14 wall
15 hinge pin mount
16 hinge pin mount
17 first joint axle
18 second joint axle
19 connector(s)
20 outer hinge lever
21 bridge
22 wall element
23 knuckle
24 knuckle
25 spring
26 spring arm
27 spring element
28 spring arm
29 joint axle
30 inner hinge lever
31 lever arm
32 end eye
33 bearing section
34 knuckle
35 actuating piece
35.1 bearing mount
35.2 bearing axle
36 joint axle
40 second hinge part
41 mounting section
41.1 retaining element
42 transition section
43 sliding piece
44 first locating mount
44.1 locating element
45 second locating mount
45.1 locating element
45.2 hinge pin mount
45.3 hinge pin mount
46 lug
46.1 wall piece
46.2 retaining lug
47 counter bearing
48 guide element
48.1 third guide mount
48.2 locating element
50 damper
51 piston rod
52 damper housing
53 actuating piece
60 carriage
61 base part
62 damper mount
63 guide
64 slideway
65 lug
66 support section
67 coupling piece
68 mount
70 base part
71 mounting section
72 attachment mount
73 connection piece
74 clamping section
75 mounting section
76.1 guide
76.2 further guide section
77 retaining mount
78 clamping bolt
80 connector(s)
81 holder
82 drilled hole
83 drilled hole
84 penetration
100 washing machine front panel
101 loading opening
102 magnetic lock part
103 ferromagnetic part
104 door FIG. 1 shows an exemplary and preferred application of the invention. There, the hinges according to the invention are used to attach a door 104 to a household appliance in a swiveling manner. In this exemplary embodiment, the household appliance shown is a washing machine.

Such a washing machine has a washing machine front panel 100. The washing machine front panel 100 is penetrated by a loading opening 101. The load opening 101 provides the user with access to the washing drum of the washing machine. To be able to integrate such a household appliance into the front of a kitchen unit, hinges are used to hinge the door 104 to the body of the machine. Two hinges are used in this exemplary embodiment for this purpose. The hinges each have (see FIG. 2) a base part 70. The latter can be connected to the machine body. The hinges further comprise a first hinge part 10. This first hinge part 10 is connected to the door 104.

To be able to keep the door 104 secured in the closed state, for instance, magnetic locking parts 102 may be used to interact with ferromagnetic parts 103 to form a magnetic connection. In each case, one of these components is attached to the front panel of the washing machine 100, and the other component is attached to the door 104. The magnetic connection not only ensures that the door 104 does not open unintentionally, but also prevents the door 104 from swinging relative to the front panel 100 of the washing machine during operation of the washing machine.

FIGS. 3 to 10 show a first exemplary embodiment of a hinge according to the invention. As FIGS. 3 and 4 show, the hinge has a first hinge part 10. The first hinge part 10 is preferably integrally formed. It has a mounting flange 12 with attachment mounts, in particular screw mounts 13. A hinge cup 11 is connected to the mounting flange 12. The hinge cup 11 is configured such that the hinge having the form of a cup hinge can be inserted into a cup mount of a door 104.

The first hinge part 10 has two spaced-apart walls 14. Hinge pin mounts 15 and 16 are incorporated into the walls 14. The hinge pin mounts 15 in the walls 14 are interaligned. Furthermore, the hinge pin mounts 16 in the walls 14 are also interaligned.

A second hinge part 40 can be coupled to the first hinge part 10 via a four-bar linkage system in an articulated manner. In this case, the four-bar linkage system has two hinge levers, an outer hinge lever 20 and an inner hinge lever 30.

The outer hinge lever 20 has two spaced-apart wall elements 22, which are interconnected by a bridge 21. Each of the wall elements 22 has two knuckles 23, 24. The knuckles 23 are interaligned; just like the knuckles 24. The two wall elements 22 of the outer hinge lever 20 can be set in the area of the first hinge part 10 formed between the two walls 14. Preferably, the outer sides of the wall elements 22 are guided on the insides of the walls 14 facing each other. The knuckles 23 are aligned with the hinge pin mounts 15, thus a first hinge axis 17, which may have the form of a pin, may be inserted through the aligned hinge pin mounts 15 and the knuckles 23 to provide a swivel coupling of the outer hinge lever 20 to the first hinge part 10.

The inner hinge lever 30 has a lever arm 31 to which an end eye 32 may be directly connected.

The inner hinge lever 30 supports two spaced-apart bearing sections 33. Interaligned knuckles 34 may be provided on these bearing sections 33.

As FIG. 5 shows, the inner hinge lever 30 has one, preferably two, actuating pieces 35. The actuating pieces 35 are preferably integrally formed on the bearing sections 33.

To assemble the inner hinge lever 30, the end eye 32 is placed in alignment with the hinge pin mounts 16 of the first hinge part 10 and placed between the walls 14. Then, a second hinge axis 18 extending through the hinge pin mounts 16 and the end eye 32 can be used to achieve an articulated coupling of the inner hinge lever 30 to the first hinge part 10.

The second hinge part 40 has a mounting section 41, as further shown in FIG. 5. The mounting section 41 is equipped with a retaining element 41.1. The retaining element 41.1 has an elongated hole.

At the end facing away from the retaining element 41.1, the mounting section 41 merges into a transition section 42.

The second hinge part 40 is provided with walls on its two longitudinal sides. These two walls are spaced apart, and preferably extend in parallel to each other. The two walls can form sliding pieces 43 on the outer sides facing away from each other.

The two walls are each provided with a first locating mount 44.1. The first two locating mounts 44.1 are interaligned. Further, a second locating mount 45 may be provided in each of the walls, wherein the second locating mounts 45 are interaligned. Furthermore, hinge pin mounts 45.2 and hinge pin mounts 45.3 may be provided in the two walls. The hinge pin mounts 45.2 and the hinge pin mounts 45.3 are interaligned.

The second hinge part 40 is provided with a lug 46 on its rear end. This lug 46 is located between the two sliding pieces 43.

To couple the outer hinge lever 20 to the second hinge part 40 in a swiveling manner, the outer hinge lever 20 is placed between the two longitudinal walls of the second hinge part 40. In this case, the wall elements 22 then face the insides of the walls of the second hinge part 40. The knuckles 24 are aligned with the hinge pin mounts 45.3. In that way, a joint axle 29 can be inserted through the aligned hinge pin mounts 45.3 and the knuckles 24 to form a hinge joint.

The inner hinge lever 30 is also connected to the second hinge part 40 in a similar manner. The inner hinge lever 30 is placed between the two walls of the second hinge part 40, such that the outer sides of the bearing sections 33 face the insides of the walls. Then the knuckles 34 are aligned with the hinge pin mounts 45.2. A joint axle 36 extending through the aligned knuckles 34 and the hinge pin mounts 45.2 can be used to establish the hinge connection.

As FIG. 5 shows, a spring 25 can optionally be connected to the hinge. The spring 25 is designed such that it supports the closing motion of the first hinge part 10 relative to the second hinge part 40, and in that way supports the closing motion of the door 104 over at least a portion of its closing motion.

The spring 25 has a spring element 27 to which two spring arms 26, 28 are attached. The spring arms 26, 28 can be moved relative to each other against the force of the spring element 27. The spring arm 28 is arranged and formed such that it is rests on the end of the first joint axle 17. The second spring arm 26 is designed and arranged to be supported relative to a locating element 45.1. This can be clearly seen in figures The locating element 45.1 can advantageously be designed as a bolt, which extends through the two aligned second locating mounts 45.

Advantageously, the spring 25 is formed from a section of wire, wherein the spring element 27 is wound as a spiral spring. As can be seen from FIGS. 8 to 10, the spring 25 is retained on the joint axle 29, for which purpose the joint axle 29 passes through the coiled spring element 27.

A damper unit can optionally be connected to the hinge 10. The damper unit comprises a damper 50, which is designed as a fluid linear damper. This damper 50 has a damper housing 52. A piston can be displaced against the pressure of a fluid, for instance air or a liquid, in particular oil, in the damper housing 52. A piston rod 51 is connected to the piston. The piston rod 51 bears an actuating piece 53. The actuating piece 53 can be integrally formed by the piston rod 51 or can be placed on the piston rod 51 as a separate component. The actuating piece 53 may also be referred to as an actuating component 53.

The damper unit comprises a carriage 60. The carriage 60 has a base part 61 having a damper mount 62. The base part 61 has guides 63 on its two longitudinal sides. They can be formed by the lateral wall elements of the base part 61. The base part 61 may be referred to as a carriage base part 61.

On its underside, the carriage 60 is equipped with a slideway 64. The slideway 64 may have the form of a recess recessed from the base part 61. As FIG. 5 further shows, the carriage 60 may include a rear lug 65. Furthermore, a support section 66 is provided on the base part 61. In this exemplary embodiment, two support sections 66 are provided on opposite sides of the base part. However, it is also conceivable to use only one support section 66.

The damper unit may be connected to the second hinge part 40. For this purpose, the damper 50 is inserted into the damper mount 62 of the carriage 60. The damper housing 52 rests on the rear of a stop surface of the damper mount 62 in the direction of the longitudinal extension of the piston rod 51 in a form-fitting manner.

The unit thus formed can be inserted into the second hinge part 40 from below. This is shown in particular in FIG. 8. As can be seen from this illustration, in the assembled state, the actuating piece 53 of the damper 50 is applied to the inside of a counter bearing 47 of the second hinge part 40.

Within the damper 50, there is a spring that acts on the piston to hold it in the extended position and thus to hold the piston rod 51 in the extended position shown in FIG. 8. If the piston rod 51 is retracted, this is done against the pressure of this spring. When the piston rod 51 is re-released, the spring pushes the piston rod 51 back to the initial position shown in FIG. 8.

To locate the damper unit, the damper housing 52 is held on the locating element 45.1. This locating element 45.1 is preferably the same locating element 45.1 that supports the spring arm 26 as well. Further, the damper housing 52 rests against the underside of the mounting section 41. The locating element 44.1 is used to prevent the damper unit from falling downwards out of the second hinge part 40. This locating element 44.1 extends through the interaligned first locating mounts 44. In the assembled state, the locating element 44.1 forms a guide arrangement in conjunction with the slideway 64. This guide arrangement allows the carriage 60 and with the carriage 60 the damper housing 52, to be moved linearly in the direction of the longitudinal extension of the piston rod 51. When the carriage 60 is displaced, the base part 61 slides on the first locating element 44.1. Furthermore, the damper housing 52 slides along the locating element 45.1 and finally the damper housing 52 also slides along the underside of the mounting section 41. In particular, the guide can be designed to provide a small guide play between the guide partners mentioned.

FIGS. 8 to 10 further show that the damper unit is supported relative to the inner hinge lever 30. For this purpose, the lug 65 engages between the two bearing sections 33 of the inner hinge lever 30. Preferably, the lug 65 is in contact (with slight play) with the insides of the two bearing sections facing each other. In this way, the damper unit is prevented from moving in the direction of the central longitudinal axis of the joint axle 36.

Figure 6:
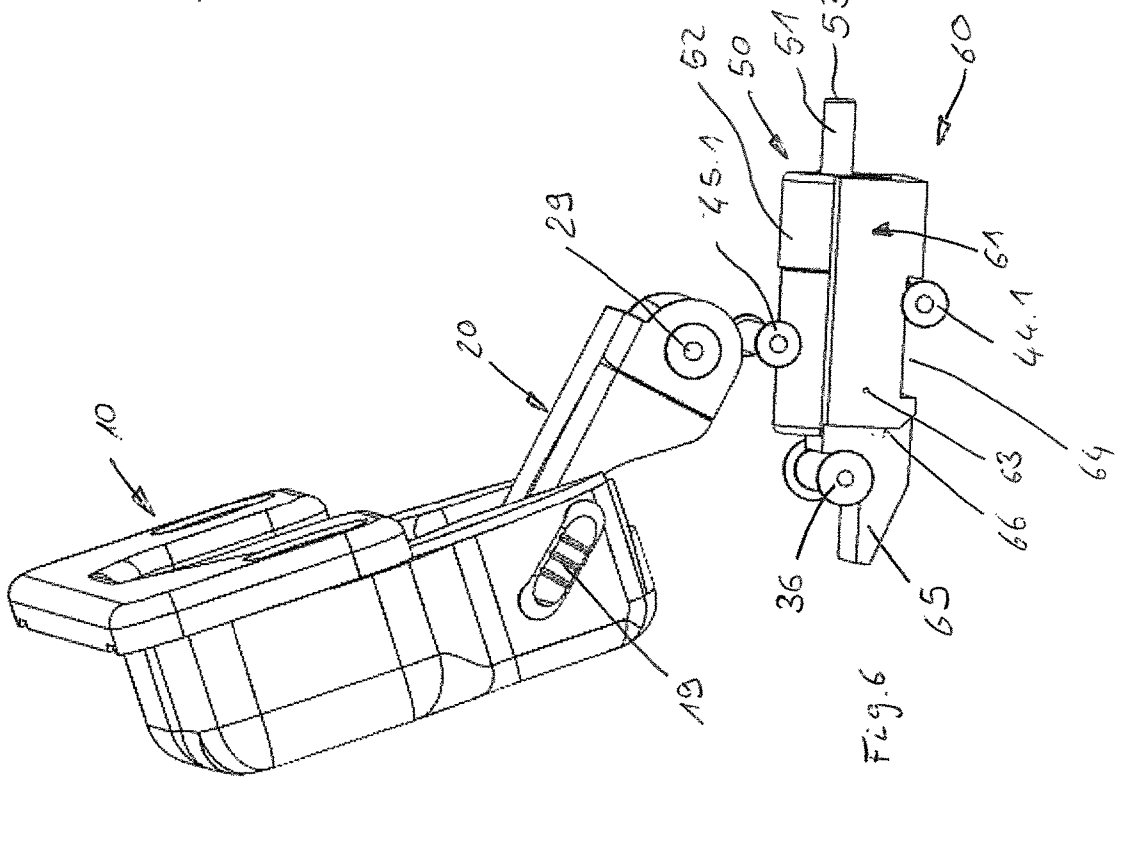

FIGS. 6 and 7 show that the damper unit can also be guided with the joint axle 36 in the area of its lug 65. For this purpose, the joint axle 36 overlaps the upward facing guide surface of the lug 65.

FIG. 5 further shows that the hinge includes a base part 70. The base part 70 has a mounting section 71. The mounting section 71 has a front end and an opposite rear end. In FIG. 1, the front end is the end facing upwards toward the viewer. The back is the surface of the base part 70 facing downwards.

In particular, the rear surface may define or form a planar mounting section. This mounting section can be used to place the base part 70 against a surface of the cabinet box or machine body. The mounting section 71 is penetrated by attachment mounts 72. As shown here, the attachment mounts 72 can advantageously be formed as elongated holes. The longitudinal axes of the two slotted holes 72 extend in the direction of a first adjustment direction.

The base part 70 has a retaining mount 77. The retaining mount 77 penetrates the base part 70 from the front to the rear.

On its longitudinal sides the retaining mount 77 may be delimited by guides 76.1. In that case, the guides 76.1 form guide surfaces facing the retaining mount 77.

A clamping section 74 is provided in the one end area of the base part 70 facing the guides 76.1. A mounting section 75 may be integrally formed on the clamping section 74. Advantageously, the mounting section 75 has a screw mount. Preferably, the thread axis of this screw mount can be perpendicular to the upper clamping surface formed by the clamping section 74. Opposite the clamping section 74, the base part 70 has a connection piece 73. This connection piece 73 engages over a guide section 76.2 of the guide 76.1. Further guide surfaces may be provided on the guide section 76.2. The further guide surfaces are aligned with the guide surfaces assigned to the clamping piece 74.

The retaining mount 77 is delimited by the two guides 76.1, the clamping section 74 and the connection piece 73.

Below, the function of the hinge described above is explained with reference to FIGS. 8 to 10.

FIG. 8 shows the open position of the hinge. In this position, the spring 25 is tensioned. The spring arm 26 rests on the locating element 45.1 preloaded by the spring. The spring arm 28 rests against the first joint axis 17 in a preloaded manner. As FIG. 8 shows, the piston rod 51 is in its extended position. The actuating piece 35 of the inner hinge lever 30 does not act on the carriage 60; when the first hinge part 10 is swiveled relative to the second hinge part 40, the two hinge levers 20 and 30 also swivel.

In FIG. 9, when the contact point between the spring arm 28 and the first hinge axis 17 has passed a dead center position, the spring force is effective to pull the first hinge part 10 to its closed position under the action of the spring 25. As FIG. 9 shows, the two actuating pieces 35 of the inner hinge lever 30 hit the assigned support sections 66 of the carriage 60. During a further motion in the closing direction, the damping force of the damper 50 becomes effective and acts against the closing force of the spring 25. For this purpose, the actuating pieces 35 are used to displace the carriage 60. This causes the piston rod 41 and with it the piston to slide into the damper housing 52. This causes the damping force.

When the door 104 is now re-opened, the first hinge part 10 moves from the closed position shown in FIG. 10 to the intermediate position shown in FIG. 9, wherein the spring 25 is re-tensioned. The piston rod 51 is pushed out of the damper housing 52. FIG. 8 shows the fully open position of the hinge.

To mount the hinge on a machine body or cabinet box, the rear end of the base part 70 (that is the downward facing surface shown in FIG. 10) is placed on a matching surface of the machine body or cabinet box and screwed there using fastening screws, which are passed through the attachment mounts 72. The assembly unit formed by the two hinge parts 10, 40, the two hinge levers 20, 30 and the damper unit is pre-assembled. This assembly in conjunction with the hinge cup 11 of the first hinge part 10 is inserted into a cup mount of the door 104. The screw mounts 13 can be used to screw the hinge to the door 104. For final assembly, the second hinge part 40 is inserted into the retaining mount 77 of the base part 70. As FIG. 8 shows, the lug 46 of the second hinge part 40 engages behind the connection piece 73 in a form-fitting manner. The two slideways 43 rest against the guides 76.1. In the area of the lug 76, the sliding pieces 43 can rest against the further guide section 76.2.

FIGS. 8 to 10 show that the mounting section 75 engages with the penetration of the retaining element 41.1. A clamping bolt 78 can be used to connect the second hinge part 40 to the base part 70. Here, the clamping bolt 78 is passed through the elongated hole of the retaining element 41.1 formed by the penetration and bolted into the bolt mount of the mounting section 75. In this way, the mounting section 41 of the second hinge part 40 is braced with the clamping section 74.

FIGS. 11 to 17 show a further exemplary embodiment of the invention. In this exemplary embodiment, identical or similarly acting components are described using the same reference signs used above with respect to the first exemplary embodiment. The statements above relating to these components therefore also apply to this second exemplary embodiment. To avoid repetition, the differences between the exemplary embodiments are therefore discussed below.

As FIG. 13 shows, the inner hinge lever 30 again has a lever arm 31 having an end eye 32. The two bearing sections 33 are again connected to the lever arm 31. FIG. 13 indicates that the actuating piece 35 is arranged between the two bearing sections 33. This actuating piece 35 interconnects the two bearing sections 33 and is integrally bent from the lever arm 31. The two bearing sections 33 may be integrally bent from the actuating piece 35. The actuating piece 35 can be seen more clearly in FIG. 14.

The second hinge part 40 has a lug 46 for mounting the damper 50. The damper 50 is again of the same design as the damper 50 according to the first exemplary embodiment.

The lug 46 is formed like a pocket. It has two spaced-apart wall sections 46.1. At their longitudinal end, the two wall pieces 46.1 are connected to the counter bearing 47.

As FIGS. 15 to 17, the damper 50 is inserted into the pocket-shaped recess of the lug 46. The damper 50 is inserted into this mount from above. Retaining lugs 46.2 are provided on the wall sections 46.1, in particular integrally formed. These retaining lugs 46.2 preferably form snap lugs. To mount the damper 50, it is pressed into the pocket-shaped mount. The retaining lugs 46.2 engage behind the damper housing 52 and in that way hold the damper 50 in the pocket-shaped mount in a form-fitting manner.

The piston rod 51 rests against the counter bearing 47 of the second hinge part 40.

In the open hinge position, shown in FIG. 15, the actuator 35 is still out of operative engagement with the damper 50. The spring 25 is re-tensioned. After passing a dead center position, the spring 25 becomes effective and pulls the first hinge part 10 towards the closed position shown in FIG. 17. In the process, as FIG. 16 shows, the actuating piece 35 comes into engagement with an actuating piece 53, which is now arranged on or formed by the damper housing 52. During further motion in the closing direction, the inner hinge lever 30 is displaced, wherein its actuating piece 35 linearly displaces the damper housing 52 in the damping direction. This dampens the closing motion of the hinge. The two retaining lugs 46.2 are designed to permit a longitudinal displacement of the damper housing 52 in the direction of the central longitudinal axis of the piston rod 51.

FIGS. 18 to 24 show a third exemplary embodiment of the invention. In this exemplary embodiment, identical or similarly acting components are described using the same reference signs used above with respect to the first and the second exemplary embodiments. The statements above relating to these components therefore also apply to this third exemplary embodiment. To avoid repetition, the differences between the exemplary embodiments are therefore discussed below.

FIG. 20 shows the modified embodiment of the second hinge part 40. As this embodiment illustrates, the second hinge part 40 includes a guide element 48 adjacent to the retaining element 41.1. The guide element 48 forms a hollow body that is open at the bottom.

The wall elements, which preferably form the sliding pieces 43, extend beyond the retaining element 41.1 and join the guide element 48 on both sides. Third interaligned locating mounts 48.1 are inserted into these walls below the guide element 48. A locating element 48.2 can be inserted through these third locating mounts 48.1.

FIG. 20 clearly shows the modified carriage 60. This illustration shows that the carriage 60 has a base part 61, and 2 coupling pieces 67 are formed on the base part. The coupling pieces 67 bear mounts 68 at their ends. The mounts 68 are provided with the support sections 66, which in this case have the shape of drilled holes.

A connector 80 is located between the two spaced-apart coupling pieces 67. The connector 80 has two spaced-apart holders 81, which are interconnected by an integrally molded-on connection part. The interaligned drilled holes 82, the interaligned drilled holes 83 and/or the interaligned penetrations 84 are machined into the two holders 81.

As FIG. 21 shows, the locating element 45.1 is used to swivel connect the connector 80 to the second hinge part 40. For this purpose, the locating element 45.1 can, for instance, be pushed through the aligned second locating mounts 45 and the aligned drilled holes 83.

The connector 80 provides the connection between the inner hinge lever 30 and the carriage 60.

The bearing axle 35.2 is used to couple the inner hinge lever 30 coupled to the connector 80. This bearing axle 35.2 is inserted through the interaligned bearing mounts 35.1 of the inner hinge lever 30 and the also interaligned drilled holes 82 of the connector 80, which are designed as elongated holes.

The locating element 48.2 is used for coupling the carriage 60. The locating element 48.2 is guided through the interaligned mounts 68 of the carriage 60 and the penetrations 84, which are also aligned therewith and which are formed as elongated holes and which are provided on the connector 80.

The assignment and coupling of the inner hinge lever 30, the connector 80 and the carriage 60 can be clearly seen in FIG. 21. As this embodiment further shows, the damper 50 can be inserted into the damper mount 62 of the base part 61. For this purpose, the base part 61 is formed as a hollow body whose inner contour is adapted to the outer contour of the damper housing 52. The locating element 44.1 is used to prevent the damper 50 from falling down out of the damper mount 62. This locating element 44.1 engages through the third locating mounts 48.1 of the second hinge part 40 and in that way underpins the damper housing 52.

The function of the hinge can be seen in more detail in FIGS. 22 to 24. FIG. 22 again shows the opening position of the hinge. In this position, the carriage 60 is in its initial position moved to the right in FIG. 22. The piston rod 51 is extended. The piston rod 51 rests against the counter bearing 47 of the second hinge part 40. If the first hinge part 10 now performs a closing motion again, the spring 25 becomes effective after exceeding a dead center position. It pulls the first hinge part 10 in the direction of the closed position of the hinge. On this spring-assisted closing path, the damper 50 brakes the closing motion, as in the other exemplary embodiments.

FIG. 23 shows an intermediate position, in which the damper 50 is already activated. As can be seen from this illustration, the connector 80 has already been swiveled clockwise a short distance as a result of the adjusting motion of the inner hinge lever 30. As a result of this swiveling, the connector 80 pulls the coupling pieces 67 and thus the carriage 60 in FIG. 23 from the right to the left via the locating element 48.2. This pushes the piston rod 51 into the damper housing 52, thus producing the damper effect.

FIG. 24 shows the fully closed position of the hinge. The carriage 60 is moved to its left position in FIG. 24. The piston rod 51 is fully retracted into the damper housing 52. It can be clearly seen that connector 80 has been swiveled further in a clockwise direction.

To guide the linear motion of the carriage 60, the outer contour of the base part 61 slides within the inner contour of the guide element 48 and/or the guides 63 slide on assigned linear guide surfaces of the second hinge part 40. During a displacement, the damper housing 52 also slides along the locating element 44.1.

Once the hinges described above have been installed and the door 104 has been hinged in that way, the hinge can be adjusted to align the position of the door 104.

In the horizontal direction, the door is then aligned in a simple manner by loosening the clamping bolt 78. Then, the second hinge part 40 can be moved linearly with respect to the base part 70. Once the desired adjustment position has been reached, the clamping bolt 78 can be set again.

The base part 70 is used for adjustments in the vertical direction. The fastening screws, which were screwed into the locating mounts 72 of the mounting section 71, can be loosened for this purpose. Then the base part can be adjusted vertically with respect to the machine or cabinet box. Once the desired position has been reached, the fastening screws can be re-tightened.

The invention claimed is:

1. A hinge for a piece of furniture, comprising:
a first hinge part;
a second hinge part including a lug, a retaining element and at least one sliding piece;
a first hinge lever having an articulated connection to each of the first and second hinge parts;
a second hinge lever having an articulated connection to each of the first and second hinge parts; and
a base part having a front end and a rear end and including:
a first mounting section including a mounting surface on the rear end of the base part for mounting the base part on the piece of furniture;
a second mounting section;
a retaining mount including a guide; and
a connection piece arranged at a distance from the mounting surface and having a form-fit surface directed toward the rear end of the base part;
wherein the lug of the second hinge part rests against the form-fit surface to form a form-fit connection in a direction from the rear end towards the front end;
wherein the second mounting section of the base part and the retaining element of the second hinge part form a releasable connection of the second hinge part to the base part; and
wherein the at least one sliding piece of the second hinge part is guided on the guide of the base part when the releasable connection is released.

2. The hinge of claim 1, wherein:
the at least one sliding piece of the second hinge part is guided in a linearly adjustable manner in a linear adjustment direction on the guide of the base part when the releasable connection is released.

3. The hinge of claim 2, wherein:
the first mounting section of the base part includes a plurality of elongated holes configured for mounting the base part on the piece of furniture, the elongated holes having a direction of longitudinal extension extending transverse to the linear adjustment direction.

4. The hinge of claim 3, wherein:
the direction of longitudinal extension of the elongated holes extends perpendicular to the linear adjustment direction.

5. The hinge of claim 1, wherein:
the guide of the retaining mount of the base part includes two spaced apart guide surfaces; and
the at least one sliding piece of the second hinge part includes two sliding pieces formed as walls on opposite sides of the second hinge part, and the two walls are guided linearly by the two guide surfaces of the retaining mount of the base part.

6. The hinge of claim 1, wherein:
the base part includes a clamping section;
the second hinge part includes a mounting section; and
the hinge further includes a clamping bolt clamping the mounting section of the second hinge part against the clamping section of the base part when the second hinge part is assembled with the base part.

7. The hinge of claim 6, wherein:
the second mounting section of the base part projects from the clamping section of the base part, and the second mounting section includes a bolt mount;
the retaining element of the second hinge part is arranged on the mounting section of the second hinge part and includes a penetration in a shape of an elongated hole;
the second mounting section of the base part projects into the penetration; and
the clamping bolt is bolted into the bolt mount.

8. The hinge of claim 6, wherein:
the guide of the retaining mount of the base part includes two spaced apart guides interconnected by the clamping section and the connection piece, wherein the guides, the clamping section and the connecting piece delimit the retaining mount.

9. The hinge of claim 1, wherein:
one of the hinge parts carries a damper mounted at least in part in an enclosed area of the one of the hinge parts; and
one of the hinge levers includes an actuating piece configured such that when the one of the hinge levers is moved between two actuating positions the actuating piece effects a displacement of the damper between two damping positions.

10. The hinge of claim 9, wherein:
the damper is carried by the second hinge part and is a fluid linear damper including a damper housing, a piston guided in the damper housing and a piston rod coupled to the piston.

11. The hinge of claim 10, wherein:
one of the piston rod and the damper housing includes an actuating component supported on a counter bearing of the second hinge part; and
the other of the piston rod and the damper housing is coupled to the actuating piece of the one of the hinge levers.

12. The hinge of claim 11, wherein:
the other of the piston rod and the damper housing is coupled to the actuating piece by a carriage including a carriage base part, a damper mount and a support section configured for the indirect or direct operative engagement of the actuating piece;
the damper is at least partially received in the damper mount; and
the second hinge part includes a linear guide configured to guide the carriage.

13. The hinge of claim 12, wherein:
the carriage includes at least one coupling piece projecting from the carriage base part and including the support section and a mount; and
the hinge further includes a connector swivel coupled to the mount and swivel coupled to one of the hinge levers.

14. The hinge of claim 9, wherein:
the damper is a linear damper having a damping direction and the damper is held between two damper retaining elements of the second hinge part;
the hinge further includes at least one locating element configured to support a part of the damper to hold the damper on the second hinge part such that a displacement motion of the part of the damper in the damping direction relative to the locating element is possible; and
the locating element is anchored to at least one of the two damper retaining elements.

15. The hinge of claim 14, wherein:

the locating element is bolt; and the two damper retaining elements include aligned locating mounts, the bolt being inserted into the aligned locating mounts.

16. The hinge of claim 14, wherein:

the locating element is a retaining lug projecting from one of the damper retaining elements.

17. The hinge of claim 1, in combination with the piece of furniture, wherein the piece of furniture is a washing machine, the washing machine including a washing machine body and a washing machine front panel, the washing machine front panel being penetrated by a loading opening to provide access to a washing drum, and a washing machine door hinged to the washing machine body by the hinge.

* * * * *